(12) United States Patent
Oh et al.

(10) Patent No.: US 8,148,026 B2
(45) Date of Patent: Apr. 3, 2012

(54) MULTI-LAYERED ELECTRODE FOR FUEL CELL AND METHOD FOR PRODUCING THE SAME

(75) Inventors: In Hwan Oh, Nowon-gu (KR); Eun Ae Cho, Jungnang-gu (KR); Hyoung-juhn Kim, Suwon-si (KR); Heung Yong Ha, Nowon-gu (KR); Seong Ahn Hong, Gangnam-gu (KR); Tae Hoon Lim, Songpa-gu (KR); Suk-Woo Nam, Dongdaemun-gu (KR); Sung Pil Yoon, Sungnam-si (KR); Jonghee Han, Gangnam-gu (KR); Jaeyoung Lee, Bupyeong-gu (KR); Hyung Chul Hahm, Chuncheon-si (KR)

(73) Assignee: Korea Institute of Science and Technology, Seoul (KR)

( * ) Notice: Subject to any disclaimer, the term of this patent is extended or adjusted under 35 U.S.C. 154(b) by 895 days.

(21) Appl. No.: 11/883,210

(22) PCT Filed: Oct. 31, 2005

(86) PCT No.: PCT/KR2005/003635
§ 371 (c)(1),
(2), (4) Date: Aug. 19, 2008

(87) PCT Pub. No.: WO2006/080767
PCT Pub. Date: Aug. 3, 2006

(65) Prior Publication Data
US 2009/0023018 A1  Jan. 22, 2009

(30) Foreign Application Priority Data

Jan. 27, 2005  (KR) .................. 10-2005-0007507

(51) Int. Cl.
*H01M 8/10*   (2006.01)
(52) U.S. Cl. ........ 429/482; 429/480; 429/481; 429/483; 429/492; 429/493; 429/494
(58) Field of Classification Search .................. 429/480, 429/481, 482, 483, 492, 493, 494
See application file for complete search history.

(56) References Cited

U.S. PATENT DOCUMENTS 5,561,000 A   10/1996  Dirven et al.
5,882,810 A *  3/1999  Mussell et al. ................ 429/483
(Continued)

FOREIGN PATENT DOCUMENTS
KR    1020020096195    12/2002
(Continued)

OTHER PUBLICATIONS

M. Yoshitake et al., 2002 Fuel Seminar Abstracts, 826 (2002).

*Primary Examiner* — Patrick Ryan
*Assistant Examiner* — Ben Lewis
(74) *Attorney, Agent, or Firm* — Merchant & Gould P.C.

(57) ABSTRACT

Disclosed are a multi-layered electrode for fuel cell and a method for producing the same, wherein the electrode can be operated under non-humidification and normal temperature, the flooding of the electrode catalyst layer can be prevented, and the long-term operation characteristic can be increased due to the prevention of the loss of the electrode catalyst layer.

4 Claims, 2 Drawing Sheets

U.S. PATENT DOCUMENTS

| | | |
|---|---|---|
| 6,187,467 B1 | 2/2001 | Zhang et al. |
| 6,696,382 B1 | 2/2004 | Zelenay et al. |
| 6,749,892 B2 | 6/2004 | Chang et al. |
| 2005/0031928 A1* | 2/2005 | Ishizone et al. ........... 429/33 |
| 2005/0089748 A1* | 4/2005 | Ohlsen et al. ............. 429/44 |

FOREIGN PATENT DOCUMENTS

| | | | |
|---|---|---|---|
| KR | 2003-0028908 | * | 4/2003 |
| KR | 1020030028908 | | 4/2003 |
| KR | 1020030073763 | | 9/2003 |

* cited by examiner

[Fig. 1]
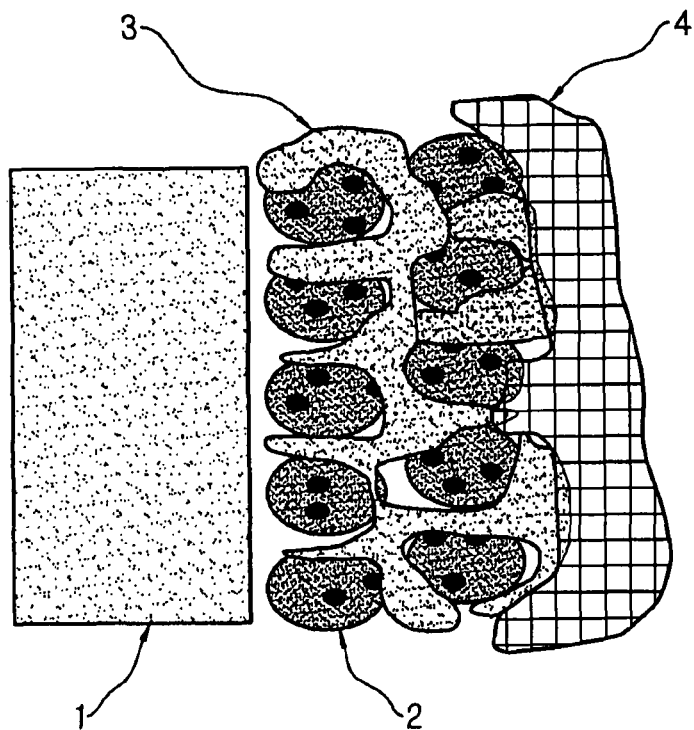
[Fig. 2]
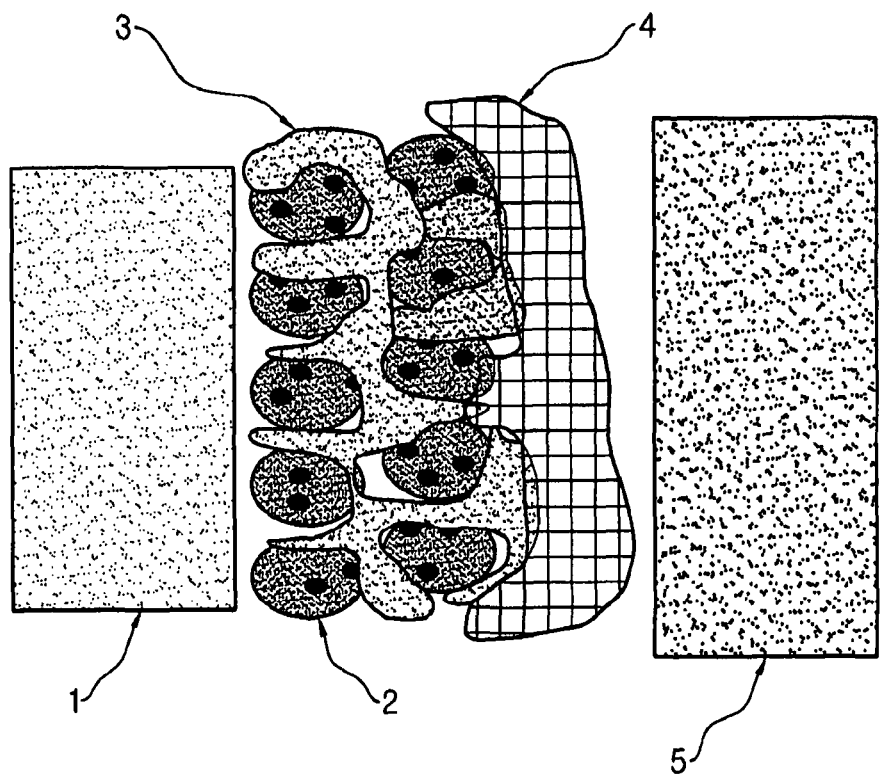

[Fig. 3]
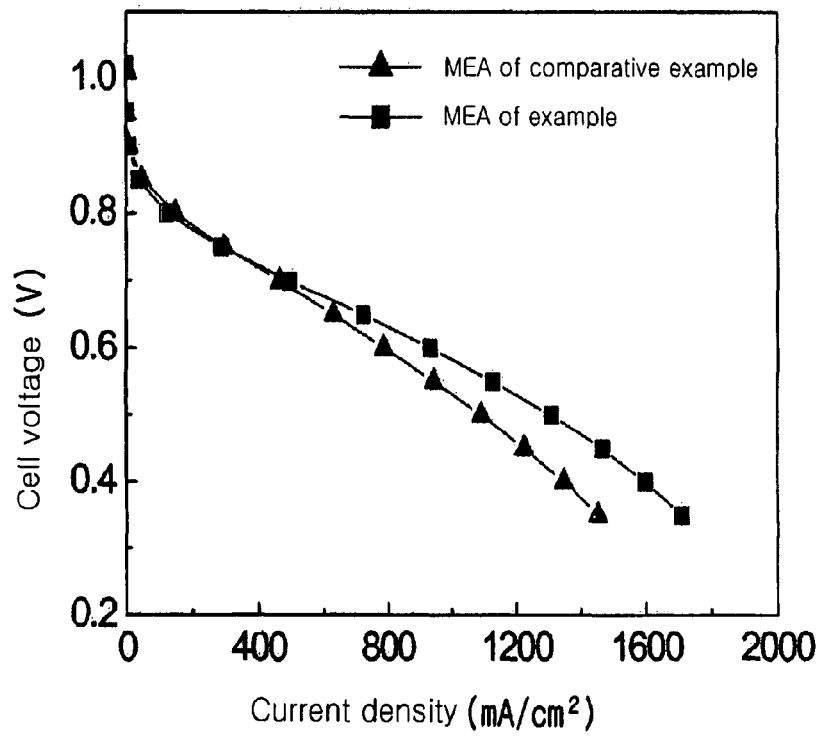
[Fig. 4]
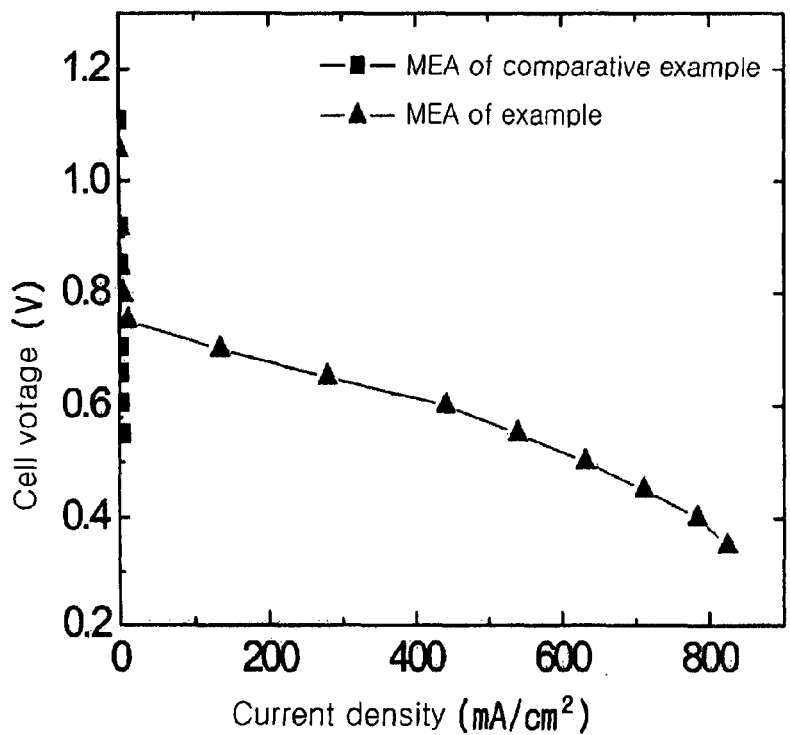

US 8,148,026 B2

MULTI-LAYERED ELECTRODE FOR FUEL CELL AND METHOD FOR PRODUCING THE SAME

TECHNICAL FIELD

The present invention relates to a multi-layered electrode for fuel cell and a method for producing the same, and particularly to a multi-layered electrode for fuel cell and a method for producing the same, wherein a distribution of the equivalent weight (hereinafter referred to "EW") of ionomer at an inside of an electrode catalyst layer and on a surface of an electrode catalyst layer is regulated so that the operation under non-humidification and normal temperature is possible, the flooding of the electrode catalyst layer can be prevented, and the long-term operation characteristic can be increased due to the prevention of the loss of the electrode catalyst layer.

BACKGROUND ART

Techniques for producing an electrode for fuel cell are known in the art as follows:

For example, a method for producing an electrode has been proposed by P. Driven et al., wherein water repellency treated carbon powders are applied on a water repellency treated porous carbon paper to form an intermediate layer, on which layer a mixture of catalyst and polymer electrolyte, i.e., high EW ionomer (e.g., EW=1,100), is then applied thinly, thereby preparing an electrode.

Then, a commercial electrolyte membrane is placed between the anode and the cathode as prepared, and hot-pressing is performed at above glass transition temperature of the electrolyte and under a certain pressure to produce a MEA <see P. Driven and W. Engelen, U.S. Pat. No. 5,561,000 (1996)>.

In producing an electrode using such method, an addition of a nafion ionomer to the electrode catalyst layer makes three-interface advantageously increased. Further, the prevention of the flooding comes to be possible.

However, such method has problems that due to the poor water absorbency of the nafion ionomer, water produced by electrochemical reaction in cathode can not be used sufficiently so that the non-humidification operation is substantially impossible to thus require an external humidifier, which correspondingly causes additional costs and volume increase.

Furthermore, such method has another problems that due to the insufficient indirect annealing of electrode by hot-pressing, the nation ionomer is leaked together with the catalyst during the operation of the fuel cell, which is disadvantageous in long-term operation of the fuel cell.

Meanwhile, a three-layered structure catalyst layer of a cathode electrode has been proposed by Yoshitake et al., wherein the first catalyst layer directly contacting the first electrolyte membrane includes an ion conductive polymer ionomer with high ion exchange capacity, i.e., with low EW, the second catalyst layer adjacent to the first catalyst layer includes an ion conductive polymer ionomer with high oxygen solubility, and the third catalyst layer includes soluble fluoropolymer <see M. Yoshitake, I. Terada, H. Shimoda, A. Watanabe, K. Yamada, K. Min and Y. Kunisa, "2002 Fuel Cell Seminar Abstracts", 826(2002)>.

In producing an electrode using such method, a nafion ionomer with high EW is added to the first and second catalyst layers so that in comparison with the prior electrode, interface resistance between the electrode and the electrolyte membrane can be advantageously reduced and the oxygen concentration in the catalyst layer can be increased to improve the performance of the fuel cell.

However, such method has problems that due to the generation of flooding resulted from high water absorbency, the performance can be abruptly reduced. Further, the method still has problems that due to the insufficient indirect annealing of electrode by hot-pressing, the nation ionomer comes to be leaked together with the catalyst during the operation of the fuel cell, which is disadvantageous in long-term operation of the fuel cell.

Specifically, according to the above prior methods, the MEA was produced with the hot pressing under the conditions of 120~140° C. temperature, 100~200 atm pressure and 30 seconds to 2 minutes time. Since the phase inversion of the nation ionomer in the electrode catalyst layer does not occur sufficiently under such conditions, the nafion ionomer serving to transfer hydrogen ion between the electrode and the electrolyte membrane and to bind the catalyst comes to be re-solved by wet reaction gas and leaked out together with the catalyst during the operation of the fuel cell, so that the electrode and the electrolyte membrane are separated from each other to increase resistance, thereby causing the decrease of the performance of fuel cell and giving disadvantageous effects to the long-term operation thereof.

DISCLOSURE OF INVENTION

Technical Problem

The present invention is to solve the above problems, and an object of the invention is to provide a multi-layered electrode for fuel cell and a method for producing the same, in which the operation under non-humidification and normal temperature is possible, the flooding of an electrode catalyst layer is prevented, and a long-term operation characteristic is improved due to the prevention of the loss of the electrode catalyst layer.

Technical Solution

In order to accomplish the object, there is provided a multi-layered electrode for fuel cell comprising: a gas diffusing layer; a catalyst layer formed on the gas diffusing layer and applied with a catalyst slurry containing a solution of a nation ionomer with a specific equivalent weight (EW) and a catalyst; and a coating layer formed on the catalyst layer and coated with a solution of a nation ionomer with lower EW than the specific EW of the former nation ionomer.

In order to accomplish the object, there is also provided a method for producing a multi-layered electrode for fuel cell comprising the steps of: (S1) preparing a catalyst slurry containing a catalyst and a solution of a nation ionomer with specific equivalent weight (EW); (S2) applying the catalyst onto a gas diffusing layer; (S3) first-drying the catalyst slurry applied on the gas diffusing layer to form a catalyst layer; (S4) applying on the surface of the dried catalyst layer a solution of a nation ionomer with the lower EW than the specific EW of the nation ionomer of the catalyst slurry; (S5) second-drying the applied solution of the nation ionomer to form an electrode; and (S6) annealing the dried electrode.

Advantageous Effects

According to a multi-layered electrode for fuel cell and a method for producing the same, the operation under non-humidification and normal temperature is possible, the flooding of an electrode catalyst layer can be prevented, and a long-term operation characteristic comes to be improved due to the prevention of the loss of the electrode catalyst layer.

BRIEF DESCRIPTION OF THE DRAWINGS

FIG. 1 is a schematic view of a structure of a multi-layered electrode for fuel cell according to the present invention.

FIG. 2 is a schematic view of a structure of a MEA for fuel cell according to the present invention.

FIG. 3 is a graph showing performances in case of a comparative example and an example under 80° C. standard humidification operation condition according to an experiment 1 of the present invention, wherein ■ indicates the case of the MEA of the example, and ▲ indicates the case of the MEA of the comparative example.

FIG. 4 is a graph showing performances in case of a comparative example and an example under non-humidification operation condition according to an experiment 2 of the present invention, wherein ■ indicates the case of the MEA of the comparative example and ▲ indicates the case of the MEA of the example.

BEST MODE FOR CARRYING OUT THE INVENTION

Hereinafter, a multi-layered electrode for fuel cell and a method for producing the same according to the present invention will be described in detail.

According to the present invention, a nation ionomer with relatively high equivalent weight (EW) to that of a nation ionomer, which will be used on a surface of a catalyst layer, is put inside the catalyst layer so that the folding of the catalyst can be prevented. Further, the nation ionomer with relatively low EW, i.e., with high water absorbency and ionic conductivity to that of said former nation ionomer put inside the catalyst layer is applied on the surface of the catalyst layer so that an interface resistance between an electrode and an electrolyte membrane can be reduced while improving a performance of a fuel cell by using water produced by an electrochemical reaction, thereby enabling the non-humidification operation. Finally, mechanical properties of the nation ionomers inside the catalyst layer and on the surface of the catalyst layer are made identical to that of a commercial electrolyte membrane by annealing the electrode before assembling the electrode and the electrolyte membrane to form the MEA so that the catalyst and the nation ionomer come not to be leaked out during the operation of the fuel cell, which ensures a long-term operation.

FIG. 1 is a schematic view of the structure of the multi-layered electrode for fuel cell according to the present invention.

As shown in FIG. 1, the multi-layered electrode for fuel cell of the present invention includes Pt/C catalysts 2 applied on a gas diffusing layer 1, a nation ionomer 3 with specific equivalent weight (EW) applied between the catalysts 2, and a coating layer containing a nation ionomer 4 with lower EW than specific EW of the former nation ionomer 3 on the surface of a catalyst layer including the nation ionomer 3 and the catalysts 2.

The multi-layered electrode for fuel cell is provided such that a perfluorinated sulfonic acid nation ionomer, which has relatively high EW, i.e., relatively low ionic conductivity and water absorbency to the following nation ionomer, is included inside the catalyst layer, i.e., the catalyst layer on the gas diffusing layer, and then a coating layer of the nation ionomer solution, which has relatively low EW, i.e., relatively high ionic conductivity and water absorbency to the former nation ionomer, is formed on the surface of the catalyst layer prepared as described above.

Further, the prepared multi-layered electrode is annealed at 120~170° C. temperature for 0.5~24 hours.

FIG. 2 is a schematic view of the structure of the MEA for fuel cell according to the present invention.

As shown in FIG. 2, the prepared multi-layered electrode and a commercial nafion electrolyte membrane 5 are assembled together to make the MEA.

The present invention follows the below exemplary process in order to produce the multi-layered electrode for fuel cell.

First, a catalyst slurry containing a nation ionomer with specific EW is prepared (S1).

That is, to prepare the catalyst slurry, 20~60 wt % Pt/C (Vulcan XC-72R) is used. The total amount of the nafion ionomer used in the present invention (total amount of the nafion ionomer used in the catalyst layer and on the surface of the catalyst layer) is 20~50% of the weight of the Pt/C catalyst. In preparing the catalyst slurry (i.e., this is the case where the nafion ionomer is used in the catalyst layer), a nafion ionomer with 1,000~1,300 EW, 5 wt % or less and $1/12$~$4/12$ of the total amount of the nafion ionomer is stirred with IPA solvent or EtOH solvent for 20 minutes to 24 hours.

The most excellent performance is shown in case that the amount of $1/12$~$4/12$ of the total amount of the nafion ionomer is used in the catalyst layer. If used less than $1/12$ of the total amount of the nafion ionomer, three-interface comes to be less-formed, and if used more than $4/12$ of the total amount of the nafion ionomer, the catalyst comes to be covered completely.

Herein, it is preferable that 20~40 wt % Pt/C (Vulcan XC-72R) and a nafion ionomer with 1,100~1,200 EW, 5 wt % or less and $1/12$~$2/12$ of the total amount of the nafion ionomer are stirred together with IPA solvent or EtOH solvent for 20 minutes to 24 hours.

Next, the catalyst slurry is applied onto the gas diffusing layer (S2).

Namely, the catalyst slurry as prepared above is applied in a loading quantity of 0.04~1.2 mg-Pt/C/cm$^2$ onto 20~60 wt % PTFE carbon paper or carbon fabric, which is the gas diffusing layer, by means of spraying method or tape casting method. Herein, it is preferable to use 20~40 wt % PTFE carbon paper as the gas diffusing layer and set the loading quantity to be 0.4~0.7 mg-Pt/C/cm$^2$.

Next, the catalyst slurry applied on the gas diffusing layer is first-dried (S3).

That is, after applying the catalyst as described above, a drying is performed in an oven at 60~80° C. temperature for 30 minutes to 24 hours. Herein, it is preferable to perform the drying in the oven at 60~80° C. temperature for 1~2 hours.

Next, a solution of a nafion ionomer with lower EW than the specific EW of the nafion ionomer of the catalyst slurry is applied onto the dried surface of the catalyst layer (S4).

That is, a nafion ionomer which is 5 wt % or less and has 400~1,000 EW (or a nafion ionomer with 1,100~1,200 EW, and if the nafion ionomer of the catalyst slurry has 1,100~1,200 EW, the lower EW should be chosen) and a remainder of the total amount of the nafion ionomer (i.e., 20~50 wt % of the weight of the Pt/C catalyst) excepting the amount of the nafion ionomer of the catalyst slurry [i.e., $1/12$~$4/12$ of the total amount of the nafion ionomer (preferably $1/12$~$2/12$)] is stirred with IPA solvent or EtOH solvent for 20 minutes to 24 hours, thereby preparing a nafion ionomer solution.

The nafion ionomers used in the steps S1 and S4 are different each other in EW at the inside and the surface of the catalyst layer, wherein the EW is relatively low at the surface of the catalyst layer. As described above, the used total amount of the nation ionomer is 20~50% of the weight of the Pt/C catalyst, wherein $1/12$~$4/12$ (preferably $1/12$~$2/12$) of the total amount of the nation ionomer exists inside the catalyst layer and the remainder of the total amount of the nation ionomer excepting the amount of the nation ionomer of the catalyst slurry exists on the surface of the catalyst layer.

Next, performed is the second drying of what was applied with the nation ionomer solution (S5).

That is, after the applying of the nation ionomer solution, a drying is performed in an oven at 60~80° C. temperature for 30 minutes to 24 hours. Herein, it is preferable to perform the drying at 60~80° C. temperature for 1~2 hours.

Next, the prepared electrode is annealed in a vacuum oven (S6).

That is, the electrode is annealed in the vacuum oven at 120-170° C. temperature for 0.5~24 hours, whereby the phase inversion occurs so that a mechanical strength of the nafion becomes identical to that of the commercial nation electrolyte membrane.

Herein, it is more preferable to perform the annealing in the vacuum oven at 150~170° C. temperature for 6~18 hours.

In this way, if the annealing is performed in the vacuum oven at above glass transition temperature (120~170° C.) for 0.5~24 hours, the phase inversion occurs in the SCM (solution cast membrane) prepared by the nafion ionomer solution and the nation ionomer of the electrode catalyst layer, the mechanical properties are improved like the commercial membrane, and strong bonding to each other are obtained so as to prevent the loss of the catalyst and the nafion ionomer during the operation of the fuel cell. Accordingly the interface resistance during the operation of the fuel cell can be maintained at the substantially same level as an initial state in the MEA production, which means advantages in the long-term operation of the fuel cell.

In addition, if annealed at above glass transition temperature for a sufficient time, the nation ionomer comes to have improved mechanical properties since the main chains composed of C—F are fused to each other and sulfonic groups (—$SO_3H$) are rotated to orient from outside to inside and form an ionic bonding therebetween.

The MEA with the nation commercial membrane is prepared through such annealing, so that its mechanical properties come to increase and its lifetime extends to 1,000~100,000 hours.

The present invention will be described in detail by comparing the preferred example of the invention with comparative example. However, the present invention is not limited to the following example and various modification can be realized within the scope of the appended claims. The following example is intended to completely explain the present invention as well as to render the persons skilled in the art to easily perform the present invention.

<MEA Production of Example>

As for a catalyst material in an electrode, Pt/C powders (electrocam or E-tech), in which 20 wt % Pt is supported in a carbon black carrier (Vulcan XC-72R, Cabot), were used, and as for a catalyst support, a carbon paper (TGPH-060) with 20 wt % PTFE (polytetrafluorethylene) was used in order to provide a water repellency.

In order to prepare an ink for electrode, a Pt/C catalyst and a nafion ionomer (EW=1,100), which is 5 wt % and has the amount of $4/12$ of the total quantity of the nafion ionomer if the used total quantity of the nation ionomer is 33% of the weight of the Pt/C catalyst, were dispersed into isopropyl alcohol (IPA). For homogeneous dispersion, ultrasonic treatment was performed.

The prepared catalyst ink was coated onto the carbon paper using an air brush gun, on which carbon paper the nation ionomer (EW=1,000), which is 5 wt % and has the remainder of the total quantity of the nation ionomer excepting the nafion ionomer with 1,100 EW and is diluted with IPA, was additionally applied onto the surface of the catalyst to thus form the catalyst layers of anode and cathode. The Pt loading quantity of the catalyst was 0.4 $mg/cm^2$ at anode and 0.7 $mg/cm^2$ at cathode.

The prepared anode and cathode were placed at both sides of the pre-treated nation 115 polymer electrolyte membrane (EW=1,100). Then, a hot-pressing was performed to produce an MEA. Herein, a temperature was 140° C., a pressure 200 atm, and hot pressing time 90 seconds.

<MEA Production of Comparative Example>

As for a catalyst material in an electrode, Pt/C powders (electrocam or E-tech), in which 20 wt % Pt is supported in a carbon black carrier (Vulcan XC-72R, Cabot), were used, and as for a catalyst support, a carbon paper (TGPH-060) with 20 wt % PTFE (polytetrafluorethylene) was used in order to provide a water repellency.

In order to prepare an ink for electrode, a Pt/C catalyst and a nafion ionomer (EW=1,100), which is 5 wt % and has the amount of $4/12$ of the total quantity of the nafion ionomer if the used total quantity of the nation ionomer is 33% of the weight of the Pt/C catalyst, were dispersed into isopropyl alcohol (IPA). For homogeneous dispersion, ultrasonic treatment was performed.

The prepared catalyst ink was coated onto the carbon paper using an air brush gun, on which carbon paper the nation ionomer (EW=1,100), which is 5 wt % and has the remainder of the total quantity of the nation ionomer excepting the nafion ionomer with 1,100 EW and is diluted with IPA, was additionally applied onto the surface of the catalyst to thus form the catalyst layers of anode and cathode. The Pt loading quantity of the catalyst was 0.4 $mg/cm^2$ at anode and 0.7 $mg/cm^2$ at cathode.

The prepared anode and cathode were placed at both sides of the pre-treated nation 115 polymer electrolyte membrane (EW=1,100). Then, a hot-pressing was performed to produce an MEA. Herein, a temperature was 140° C., a pressure 200 atm, and hot pressing time 90 seconds.

<Experiment 1: 80° C. Standard Humidification Operation Condition>

In order to evaluate the performances of the MEAs of the example and the comparative example, an unit cell experiment was performed. In the experiment 1, the performances under 80° C. standard humidification operation condition were measured and compared with each other.

FIG. 3 is a graph showing performances in case of the comparative example and the example under 80° C. standard humidification operation condition according to this experiment 1 of the present invention, wherein ■ indicates the case of the MEA of the example, and ▲ indicates the case of the MEA of the comparative example.

As shown in FIG. 3, it can be seen that the MEA of the example is excellent in performance in that its current density increases at the same voltage.

<Experiment 2: Normal Temperature and Non-humidification Operation Condition>

In the experiment 2, the performances under normal temperature and non-humidification operation condition were measured and compared with each other.

FIG. 4 is a graph showing performances in case of the comparative example and the example under non-humidification operation condition according to this experiment 2 of the present invention, wherein ■ indicates the case of the MEA of the comparative example and ▲ indicates the case of the MEA of the example.

As shown in FIG. 4, it can be seen that the MEA of the example is remarkably excellent in performance.

INDUSTRIAL APPLICABILITY

According to the present invention, a multi-layered electrode for fuel cell and a method for producing the same are provided, wherein a distribution of the equivalent weight (EW) of ionomer is regulated at the inside of the electrode catalyst layer and on the surface of the electrode catalyst layer so that the prepared electrode can be operated under non-humidification and normal temperature, the flooding of the electrode catalyst layer can be prevented, and the long-term operation characteristic can be increased due to the prevention of the loss of the electrode catalyst layer.

The invention claimed is:

1. A multi-layered electrode for fuel cell comprising:
a gas diffusing layer;
a catalyst layer located on the gas diffusing layer, the catalyst layer formed from a catalyst slurry comprising 20~60 wt % of a Pt/C catalyst and 5 wt % or less of a first nafion ionomer with a first specific equivalent weight (EW) of 1,000~1,300; and
a coating layer located on the catalyst layer, the coating layer formed from a solution of a second nafion ionomer with a second specific EW less than the first specific EW of the first nafion ionomer,
wherein a total quantity of the first and second nafion ionomer is 20~50% weight of the Pt/C catalyst, and the first nafion ionomer is about 8~33% of the total quantity of the first and second nafion ionomer.

2. The multi-layered electrode according to claim 1, wherein the electrode is annealed at a temperature of 120~170° C.

3. The multi-layered electrode according to claim 1, wherein the gas diffusing layer is 20~60 wt % PTFE carbon paper or carbon fabric.

4. The multi-layered electrode according to claim 1, wherein the solution of the second nafion ionomer comprises 5 wt % or less of the second nafion ionomer with a second specific EW of 400~1,000, and the second nafion ionomer is about 67~92% of the total quantity of the first and second nafion ionomer.

* * * * *